(12) United States Patent
Huang et al.

(10) Patent No.: US 11,757,587 B2
(45) Date of Patent: Sep. 12, 2023

(54) SWITCH BETWEEN COHERENT AND NON-COHERENT PUCCH TRANSMISSIONS

(71) Applicant: QUALCOMM Incorporated, San Diego, CA (US)

(72) Inventors: Yi Huang, San Diego, CA (US); Ahmed Elshafie, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 17/327,526

(22) Filed: May 21, 2021

(65) Prior Publication Data

US 2021/0367729 A1 Nov. 25, 2021

Related U.S. Application Data

(60) Provisional application No. 63/029,552, filed on May 24, 2020.

(51) Int. Cl.
*H04W 72/04* (2023.01)
*H04L 5/00* (2006.01)
*H04W 72/20* (2023.01)

(52) U.S. Cl.
CPC ........... *H04L 5/0048* (2013.01); *H04W 72/20* (2023.01)

(58) Field of Classification Search
CPC .... H04B 7/0871; H04B 7/068; H04B 7/0619; H04B 7/0689; H04B 7/088; H04L 27/00; H04L 5/0053; H04L 5/0094; H04L 5/0023; H04W 76/27; H04W 72/042; H04W 88/02; H04W 72/044; H04W 72/04

USPC ........................................................ 370/329
See application file for complete search history.

(56) References Cited

U.S. PATENT DOCUMENTS

| | | | | |
|---|---|---|---|---|
| 10,505,618 | B2* | 12/2019 | Guo | H04B 7/0408 |
| 10,542,558 | B2* | 1/2020 | Wang | H04L 5/0082 |
| 11,343,839 | B2* | 5/2022 | Wang | H04L 5/0092 |
| 11,483,806 | B2* | 10/2022 | Matsumura | H04L 5/0073 |
| 2008/0268860 | A1* | 10/2008 | Lunttila | H04L 1/1887 455/450 |
| 2019/0082456 | A1* | 3/2019 | Kim | H04L 27/2602 |
| 2022/0006683 | A1* | 1/2022 | Qin | H04L 27/361 |
| 2022/0116183 | A1* | 4/2022 | Gao | H04L 1/1861 |
| 2022/0201757 | A1* | 6/2022 | Cruz | H04L 5/0053 |
| 2022/0217647 | A1* | 7/2022 | Matsumura | H04W 52/146 |
| 2022/0217754 | A1* | 7/2022 | Matsumura | H04L 5/0053 |
| 2022/0225120 | A1* | 7/2022 | Matsumura | H04W 72/1268 |

(Continued)

*Primary Examiner* — Man U Phan
(74) *Attorney, Agent, or Firm* — Arun Swain (57) ABSTRACT

Aspects of the present disclosure provide apparatus, methods, processing systems, and computer readable mediums that allow a switch between coherent physical uplink control channel (PUCCH) transmissions (e.g., that include demodulated reference signals (DMRS)) and non-coherent PUCCH transmissions (e.g., without DMRS). An example method by a user equipment (UE) generally includes receiving, from a network entity, a configuration of a set of PUCCH resources with different PUCCH formats, receiving signaling, from the network entity, indicating one of the PUCCH resources for a PUCCH transmission and whether the PUCCH transmission is to be sent as a coherent transmission or non-coherent transmission, and sending the coherent or non-coherent PUCCH transmission in accordance with the indication.

26 Claims, 8 Drawing Sheets

(56) References Cited

U.S. PATENT DOCUMENTS

| | | | |
|---|---|---|---|
| 2022/0225360 A1* | 7/2022 | Yi | H04W 72/23 |
| 2022/0240228 A1* | 7/2022 | Matsumura | H04L 1/1861 |
| 2022/0272672 A1* | 8/2022 | Zhu | H04W 72/04 |
| 2022/0321303 A1* | 10/2022 | Matsumura | H04L 5/0053 |
| 2022/0337998 A1* | 10/2022 | Tian | H04W 80/02 |
| 2022/0346084 A1* | 10/2022 | Elshafie | H04L 27/2646 |

* cited by examiner

PUCCH format 0

FIG. 3A

PUCCH format 1

FIG. 3B

PUCCH format 2

FIG. 3C

PUCCH format 3/4

SWITCH BETWEEN COHERENT AND NON-COHERENT PUCCH TRANSMISSIONS

PRIORITY CLAIM(S)

This application claims benefit of and the priority to U.S. Provisional Application No. 63/029,552, filed on May 24, 2020, which is expressly incorporated by reference in its entirety as if fully set forth below and for all applicable purposes.

BACKGROUND

Field of the Disclosure

Aspects of the present disclosure relate to wireless communications, and more particularly, to techniques for switching between coherent a non-coherent physical uplink control channel (PUCCH) transmissions.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages.

Certain aspects provide a method for wireless communication by a user-equipment (UE). The method generally includes receiving, from a network entity, a configuration of a set of physical uplink control channel (PUCCH) resources with different PUCCH formats, receiving signaling, from the network entity, indicating one of the PUCCH resources for a PUCCH transmission and whether the PUCCH transmission is to be sent as a coherent transmission or non-coherent transmission, and sending the coherent or non-coherent PUCCH transmission in accordance with the indication.

Certain aspects of the present disclosure are directed to an apparatus for wireless communication by a UE. The apparatus generally includes a memory and at least one processor coupled to the memory, the memory and the at least one processor being configured to receive, from a network entity, a configuration of a set of PUCCH resources with different PUCCH formats, receive signaling, from the network entity, indicating one of the PUCCH resources for a PUCCH transmission and whether the PUCCH transmission is to be sent as a coherent transmission or non-coherent transmission, and send the coherent or non-coherent PUCCH transmission in accordance with the indication.

Certain aspects of the present disclosure are directed to an apparatus for wireless communication by a UE. The apparatus generally includes means for receiving, from a network entity, a configuration of a set of PUCCH resources with different PUCCH formats, means for receiving signaling, from the network entity, indicating one of the PUCCH resources for a PUCCH transmission and whether the PUCCH transmission is to be sent as a coherent transmission or non-coherent transmission, and means for sending the coherent or non-coherent PUCCH transmission in accordance with the indication.

Certain aspects of the present disclosure are directed to a computer readable medium having instructions stored thereon for receiving, from a network entity, a configuration of a set of PUCCH resources with different PUCCH formats, receiving signaling, from the network entity, indicating one of the PUCCH resources for a PUCCH transmission and whether the PUCCH transmission is to be sent as a coherent transmission or non-coherent transmission, and sending the coherent or non-coherent PUCCH transmission in accordance with the indication.

Certain aspects provide a method for wireless communication by a network entity. The method generally includes configuring a UE with a set of PUCCH resources with different PUCCH formats, signaling the UE an indication of one of the PUCCH resources for a PUCCH transmission and whether the PUCCH transmission is to be sent as a coherent transmission or non-coherent transmission, and monitoring for a coherent or non-coherent PUCCH transmission from the UE in accordance with the indication.

Certain aspects of the present disclosure are directed to an apparatus for wireless communication by a network entity. The apparatus generally includes a memory and at least one processor coupled to the memory, the memory and the at least one processor being configured to configure a UE with a set of PUCCH resources with different PUCCH formats, signal the UE an indication of one of the PUCCH resources for a PUCCH transmission and whether the PUCCH transmission is to be sent as a coherent transmission or non-coherent transmission, and monitor for a coherent or non-coherent PUCCH transmission from the UE in accordance with the indication.

Certain aspects of the present disclosure are directed to an apparatus for wireless communication by a network entity. The apparatus generally includes means for configuring a UE with a set of PUCCH resources with different PUCCH formats, means for signaling the UE an indication of one of the PUCCH resources for a PUCCH transmission and whether the PUCCH transmission is to be sent as a coherent transmission or non-coherent transmission, and means for monitoring for a coherent or non-coherent PUCCH transmission from the UE in accordance with the indication.

Certain aspects of the present disclosure are directed to a computer readable medium having instructions stored thereon for configuring a UE with a set of PUCCH resources with different PUCCH formats, signaling the UE an indication of one of the PUCCH resources for a PUCCH transmission and whether the PUCCH transmission is to be sent as a coherent transmission or non-coherent transmission, and monitoring for a coherent or non-coherent PUCCH transmission from the UE in accordance with the indication.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums that may help improve performance, for example, by allowing a switch between coherent and non-coherent PUCCH transmissions. Advantageously, the techniques provided herein may allow for adaptation, for example, to low signal to noise ratio (SNR) channel conditions where non-coherent PUCCH transmission without demodulation reference signals (DMRS) nay lead to better performance than coherent transmission with DMRS.

The following description provides examples of techniques for optimizing a graceful leave procedure of a UE in a communication system, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
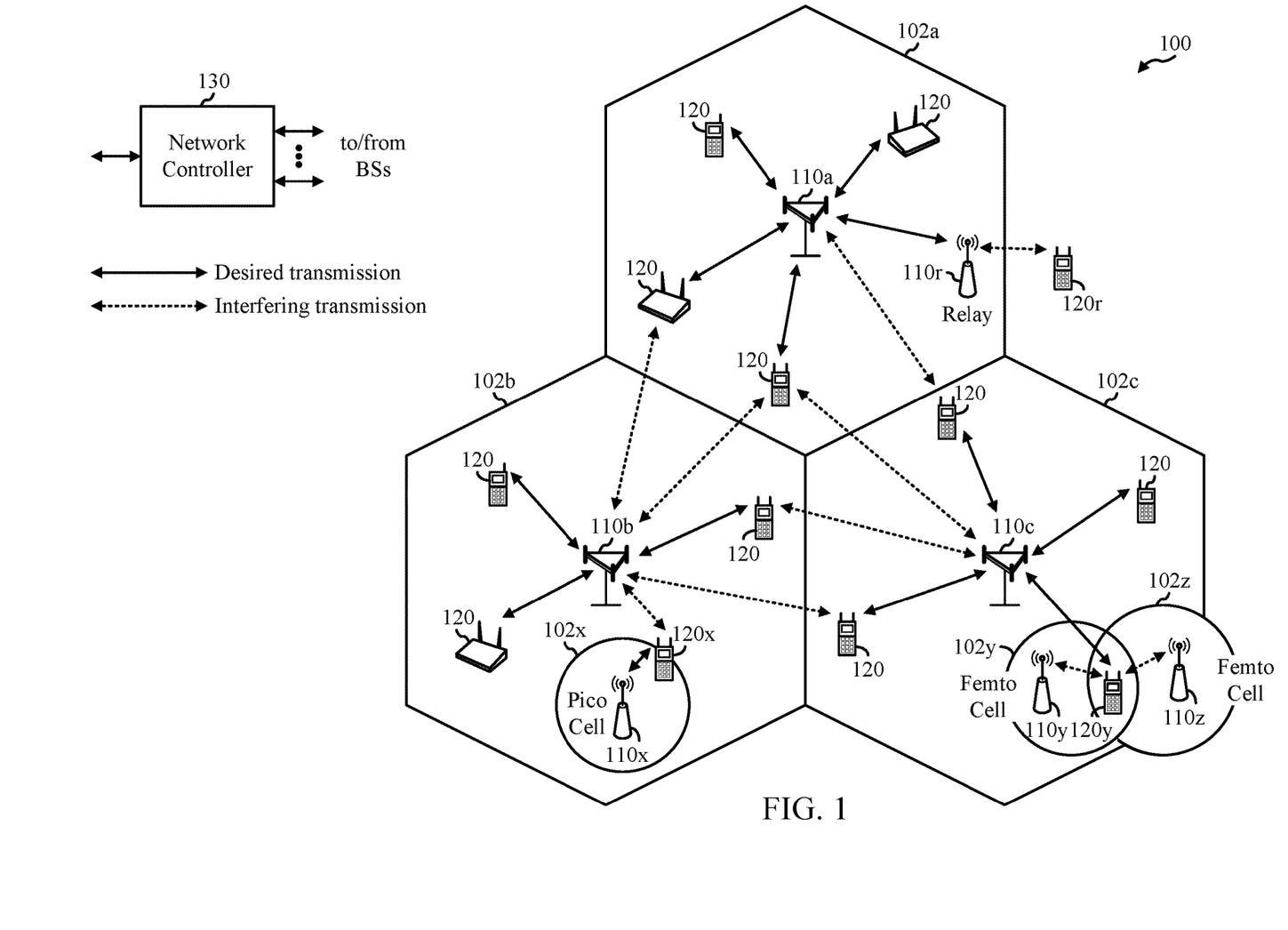
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100a may include a UE 120 that supports coherent and non-coherent PUCCH transmission, according to operations 500 of FIG. 5. Similarly, the wireless communication network 100a may include a base station 110 configured to perform operations 600 of FIG. 6 to configure and signal a UE 120 (performing operations 500 of FIG. 5) to switch between coherent and non-coherent PUCCH transmission.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
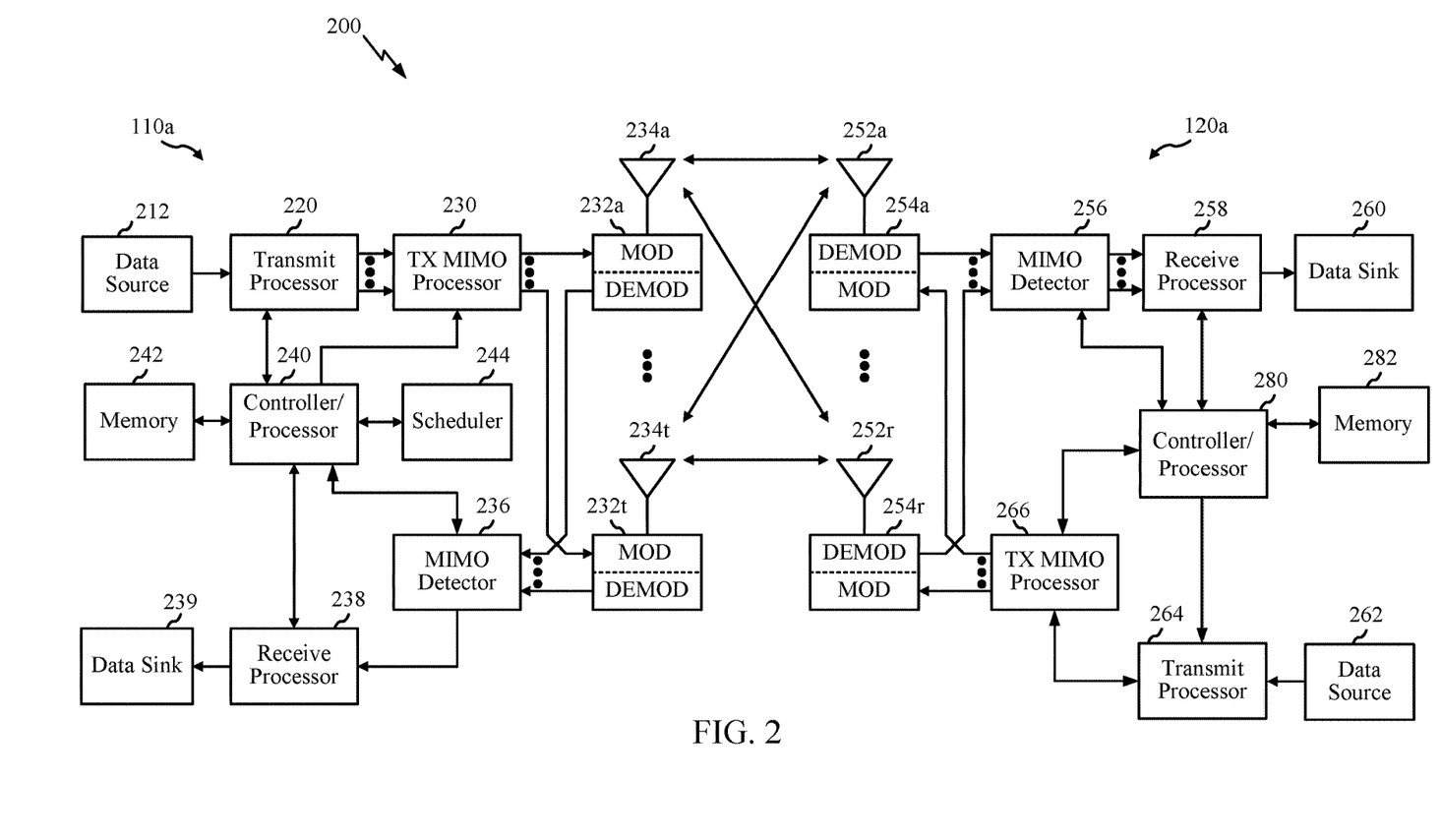
FIG. 2 is a block diagram conceptually illustrating a design of an example a base station (BS) and user equipment (UE), in accordance with certain aspects of the present disclosure.
Figure 3A:
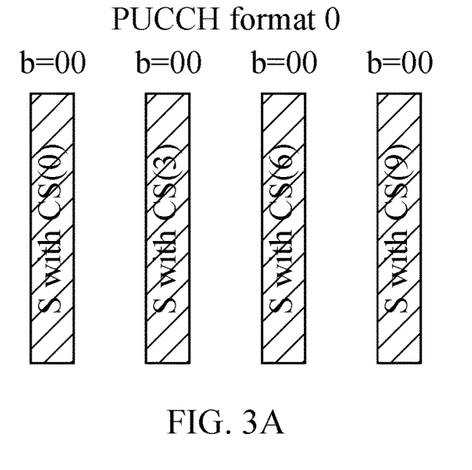
FIGS. 3A-3D illustrate example physical uplink control channel (PUCCH) resources according to different PUCCH formats.
Figure 3B:
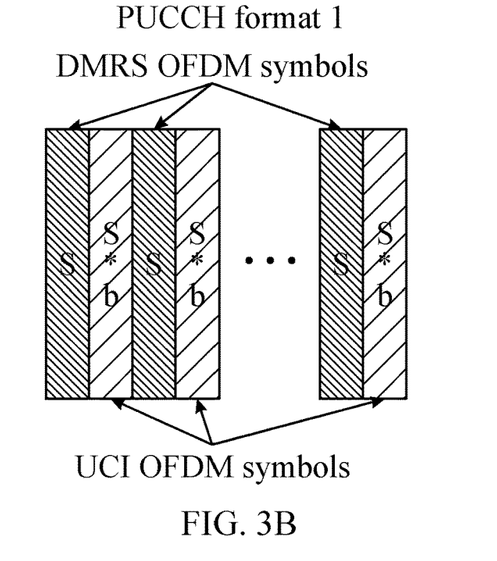
Figure 3C:
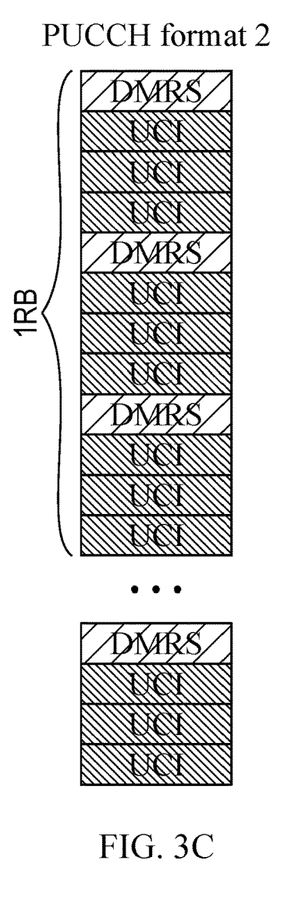
Figure 3D:
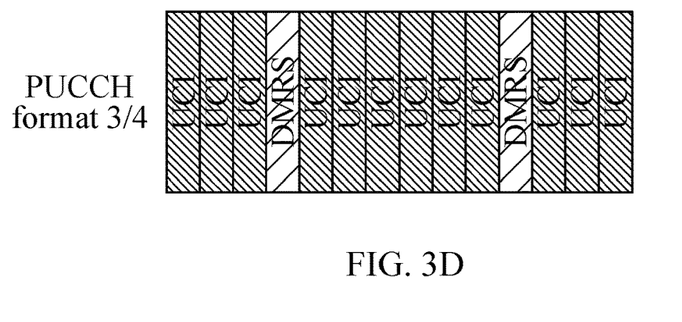

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t in transceivers. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) 254a-254r in transceivers, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, the controller/processor 280 of the UE 120a may be configured to perform operations 500 of FIG. 5. Similarly, the controller/processor 240 and/or other processors and modules at the BS 110a may perform or direct the execution of processes for the techniques described herein. For example, the controller/processor 240 of the BS 110a may be configured to perform operations 600 of FIG. 6.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In some examples, the communication between the UEs 120 and BSs 110 is referred to as the access link. The access link may be provided via a Uu interface. Communication between devices (e.g., UEs) may be referred as the sidelink.

Example Switching Between Coherent and Non-Coherent PUCCH Transmissions

Aspects of the present disclosure provide apparatus, methods, processing systems, and computer readable mediums that allow a switch between coherent physical uplink control channel (PUCCH) transmissions (e.g., that include demodulated reference signals (DMRS)) and non-coherent PUCCH transmissions (e.g., without DMRS).

A majority of wireless systems use DMRS to help a receiver perform channel estimation and use this estimated channel to perform demodulation. In these cases, DMRS and data (e.g., control or other types of data) are transmitted together. At the receiver, channel estimation is performed, followed by coherent demodulation/decoding.

FIGS. 3A-3D illustrate example resources for PUCCH formats (e.g., formats 0-4) that include DMRS. As illustrated, PUCCH format 0 can be used to transmit 1-2 bits of payload (e.g., uplink control information (UCI)) on 1-2 orthogonal frequency division multiplexed (OFDM) symbols, using different cyclic shift (CS) of base sequence S. PUCCH format 1 can be used to transmit 1-2 bits of payload on 4-14 OFDM symbols, using base sequence (S multiplied by up to 4 codepoints). PUCCH format 2 can be used to transmit more than 2 bits payload on 1-2 OFDM symbols, with DMRS frequency division multiplexed (FDM) and quadrature phase shift keying (QPSK) modulated UCI. PUCCH format 3 and 4 can be used to transmit more than two bits of payload on 4-14 OFDM symbols, using time division multiplexed (TDM) DMRS and QPSK modulated UCI.

In some cases, DMRS-based transmissions may be suboptimal. For example, at relatively low signal to noise ratio (SNR) conditions, energy spent on DMRS may not contain any useful information. As a result, channel estimation quality may be limited at low SNR, which may result in significant performance degradation in demodulation/decoding.

It may be shown that, at relatively low SNR, non-coherent transmissions without sending DMRS may result in better demodulation/decoding performance than coherent transmission. It may be advantageous, therefore, for a user equipment (UE) (e.g., an advanced UE) which can support non-coherent PUCCH transmissions and coherent PUCCH (e.g., for backward compatibility).

Accordingly, aspects of the present disclosure provide techniques that may be used to signal a UE to switch between coherent and non-coherent PUCCH transmissions. As a result, the techniques may allow PUCCH transmissions to be adapted to improve performance, for example, to signal the UE to use non-coherent PUCCH transmissions during low SNR conditions.

Figure 4:
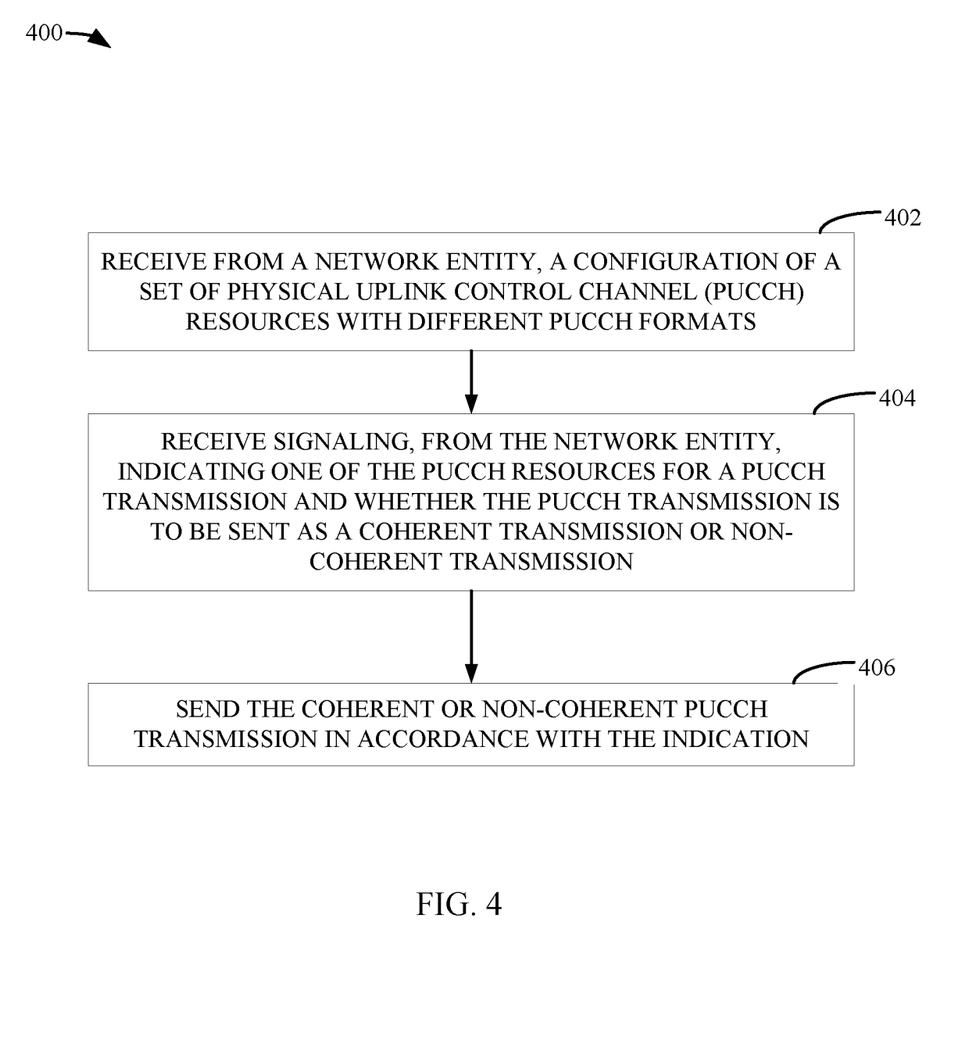
FIG. 4 illustrates example operations for wireless communication by a UE, in accordance with certain aspects of the present disclosure.

FIG. 4 illustrates example operations 400 for wireless communication by a UE, in accordance with certain aspects of the present disclosure. For example, operations 400 may be performed by a UE (e.g., UE 120a in FIG. 1 or FIG. 2) to dynamically switch between coherent and non-coherent PUCCH transmission. The operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 400 begin, at 402, by receiving, from a network entity, a configuration of a set of PUCCH resources with different PUCCH formats. At 404, the UE receives signaling, from the network entity, indicating one of the PUCCH resources for a PUCCH transmission and whether the PUCCH transmission is to be sent as a coherent transmission or non-coherent transmission. At 406, the UE sends the coherent or non-coherent PUCCH transmission in accordance with the indication.

Figure 5:
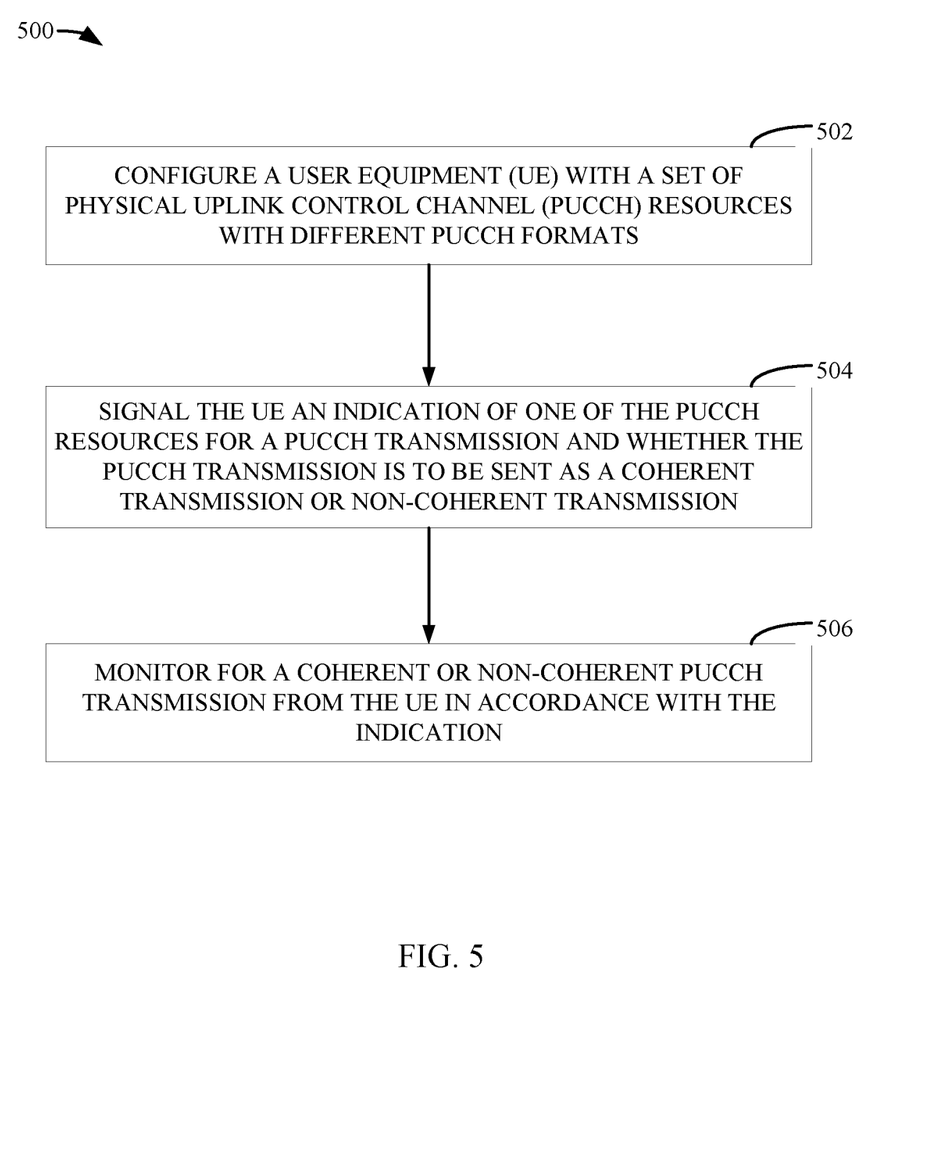
FIG. 5 illustrates example operations for wireless communication by a network entity, in accordance with certain aspects of the present disclosure.

FIG. 5 illustrates example operations 500 for wireless communication by a network entity and may be considered complementary to operations 400 of FIG. 4. For example, operations 500 may be performed by a base station 110 (e.g., a gNB) to dynamically switch a UE (performing operations 400 of FIG. 4) between coherent and non-coherent PUCCH transmission. The operations 500 may be complementary to the operations 400 performed by the UE. The operations 500 may be implemented as software components that are executed and run on one or more processors (e.g., controller/processor 240 of FIG. 2). Further, the transmission and reception of signals by the BS in operations 500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 500 begin, at 502, by configuring a UE with a set of PUCCH resources with different PUCCH formats. As illustrated, at 504, the gNB signals the UE an indication of one of the PUCCH resources for a PUCCH transmission and whether the PUCCH transmission is to be sent as a coherent transmission or non-coherent transmission. At 506, the gNB monitors for a coherent or non-coherent PUCCH transmission from the UE in accordance with the indication.

Figure 6A:
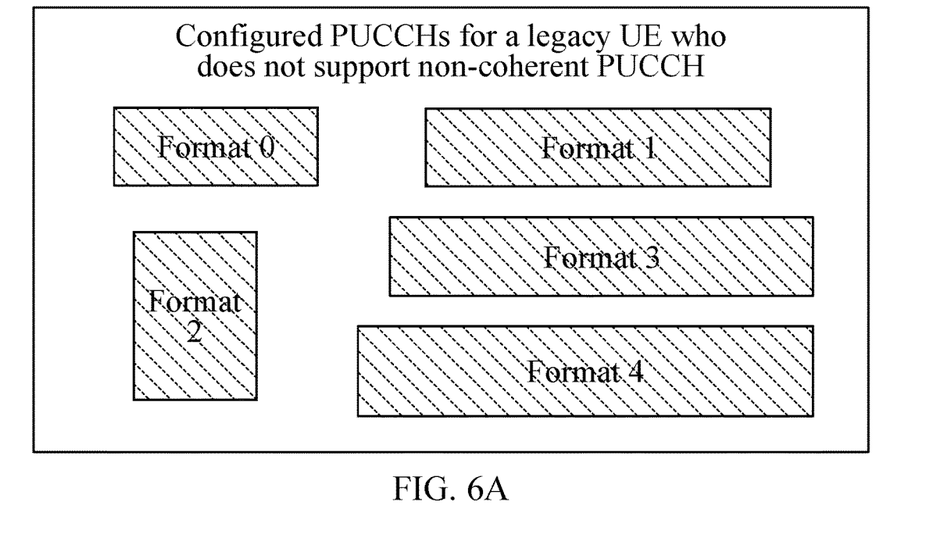
FIGS. 6A and 6B illustrate resource formats supporting coherent or non-coherent PUCCH transmissions, respectively, in accordance with certain aspects of the present disclosure.
Figure 6B:
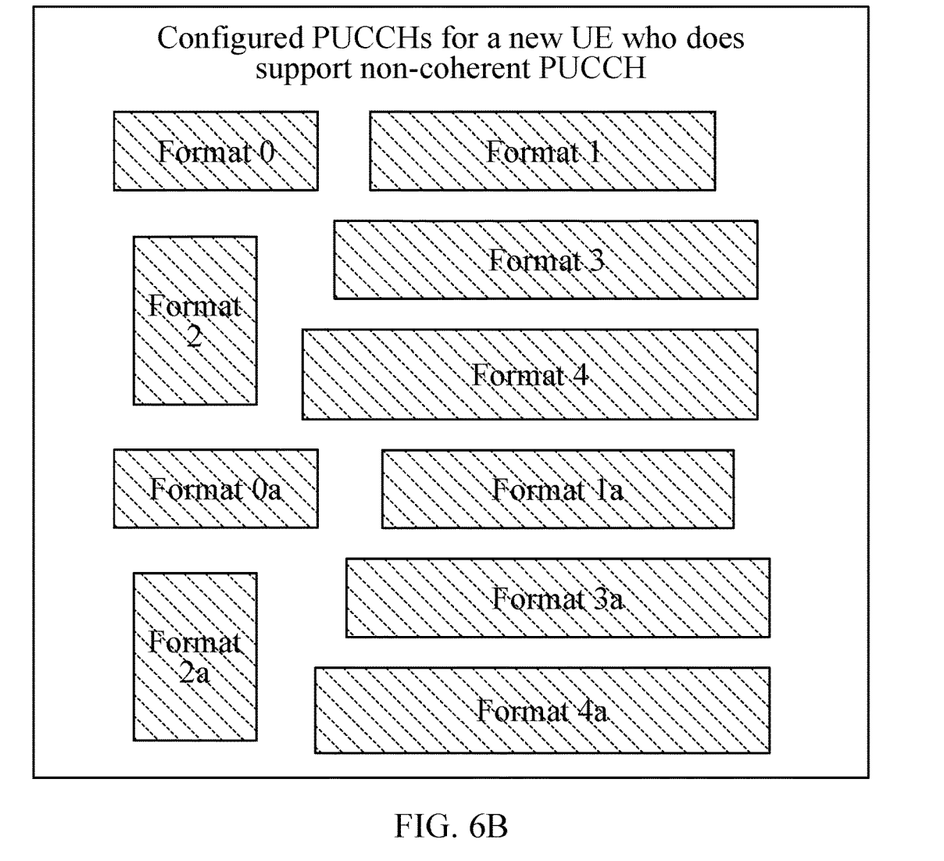

FIGS. 6A and 6B illustrate example PUCCH resource configurations that may enable dynamic switching between coherent and non-coherent PUCCH transmission, in accordance with aspects of the present disclosure.

In general, new PUCCH format(s) may be introduced for non-coherent PUCCH transmission. In some cases, the formats may correspond to existing PUCCH formats. For example, new PUCCH formats 1a-4a may be considered siblings of existing PUCCH formats 1-4, but are instead used for non-coherent PUCCH transmission.

According to one option, the gNB may configure PUCCH resources with different formats for the UE, as shown in FIG. 6B. As illustrated, the resources may include resources for legacy PUCCH formats 1, 2, 3, 4 and new PUCCH formats 1a, 2a, 3a, 4a. Formats 3a and/or 4a may be based on discrete Fourier transform spread OFDM (DFT-s-OFDM) waveform, Format 2a may be based on cyclic prefix (CP) OFDM waveform, while Format 1a and/or 4a may be fixed with 1 resource block (RB). Formats 2a and/or 3a may have more than 1 RBs configured, and the number of RBs may be either configured by radio resource control (RRC) signaling, or could follow same approach as Release 15 (e.g., configure a max number of RBs and min code rate, and permit the UE to select the RBs based on the payload size).

According to this option, the gNB may use a PUCCH resource indicator (PRI) to switch between different resources. Hence, based on the resource pointed to by the PRI value, the gNB can automatically switch the UE between coherent and non-coherent PUCCH transmission.

According to a second option, the gNB may configure the UE with conventional PUCCH format resources, as shown in FIG. 6A. In other words, the same resources may be used for both coherent and non-coherent PUCCH transmission. According to this option, there may be no change to the PUCCH resource configuration, but an additional bit (e.g., in downlink control information (DCI)) may be used to switch between coherent and non-coherent PUCCH transmission on the same PUCCH resource pointed by PRI.

The two options described above may be applied to indicate coherent or non-coherent transmission for dynamic PUCCH, such as hybrid automatic repeat request acknowledgment (HARQ-ACK) feedback. For semi-static PUCCH, such as periodic channel state information (P-CSI) reporting, similar options can also be applied, for example, with the indication of coherent or non-coherent PUCCH transmission signaled provided via RRC signaling (rather than PRI or DCI).

Example Communications Devices

Figure 7:
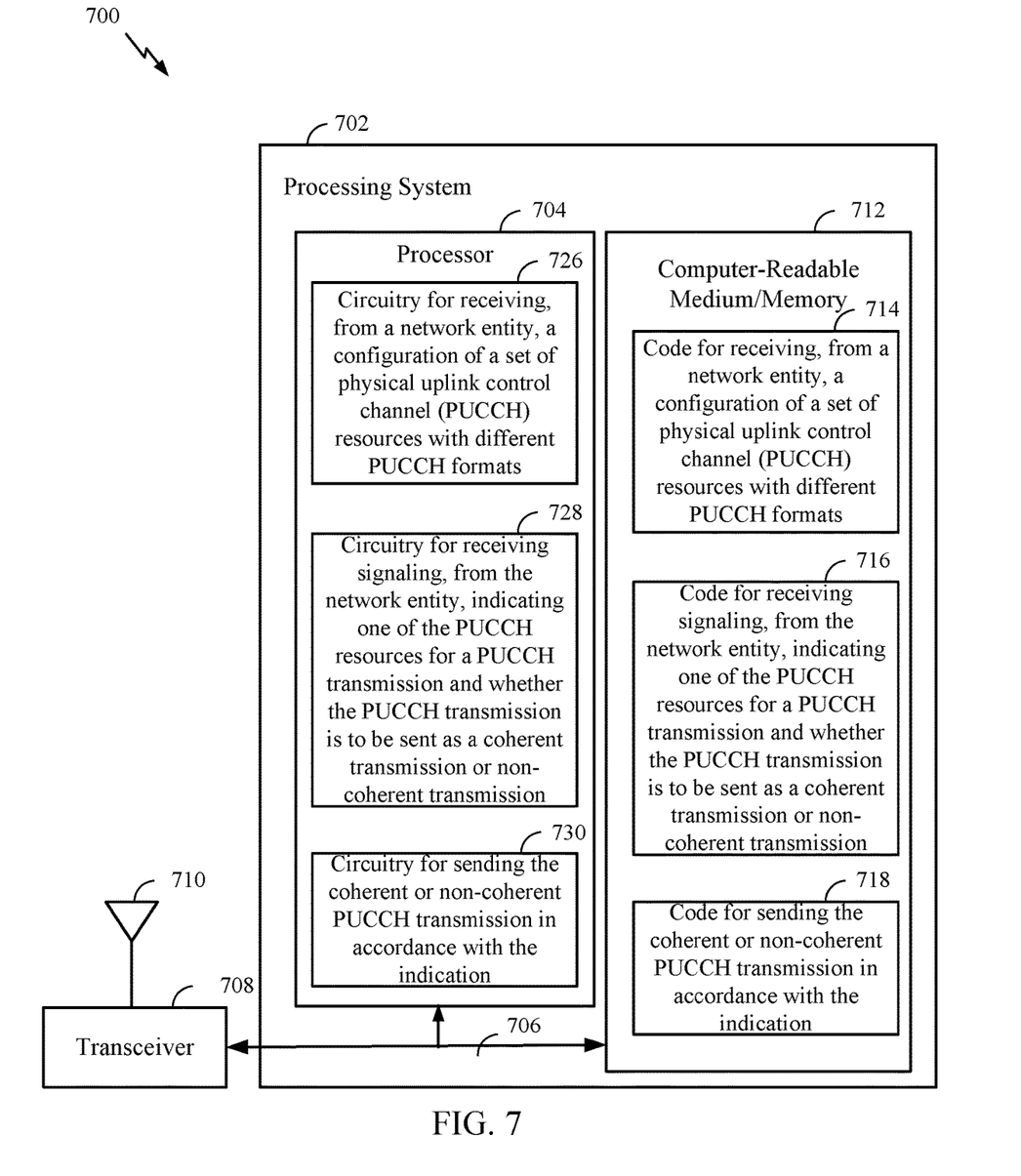
FIGS. 7 and 8 illustrate communications devices that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 5. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 4, or other operations for performing the various techniques discussed herein. In certain aspects, computer-readable medium/memory 712 stores code 714 for receiving, from a network entity, a configuration of a set of physical uplink control channel (PUCCH) resources with different PUCCH formats; code 716 for receiving signaling, from the network entity, indicating one of the PUCCH resources for a PUCCH transmission and whether the PUCCH transmission is to be sent as a coherent transmission or non-coherent transmission; and code 718 for sending the coherent or non-coherent PUCCH transmission in accordance with the indication. In certain aspects, the processor 704 has circuitry configured to implement the code stored in the computer-readable medium/memory 712. The processor 704 includes circuitry 726 for receiving, from a network entity, a configuration of a set of physical uplink control channel (PUCCH) resources with different PUCCH formats; circuitry 728 for receiving signaling, from the network entity, indicating one of the PUCCH resources for a PUCCH transmission and whether the PUCCH transmission is to be sent as a coherent transmission or non-coherent transmission; and circuitry 730 for sending the coherent or non-coherent PUCCH transmission in accordance with the indication.

Figure 8:
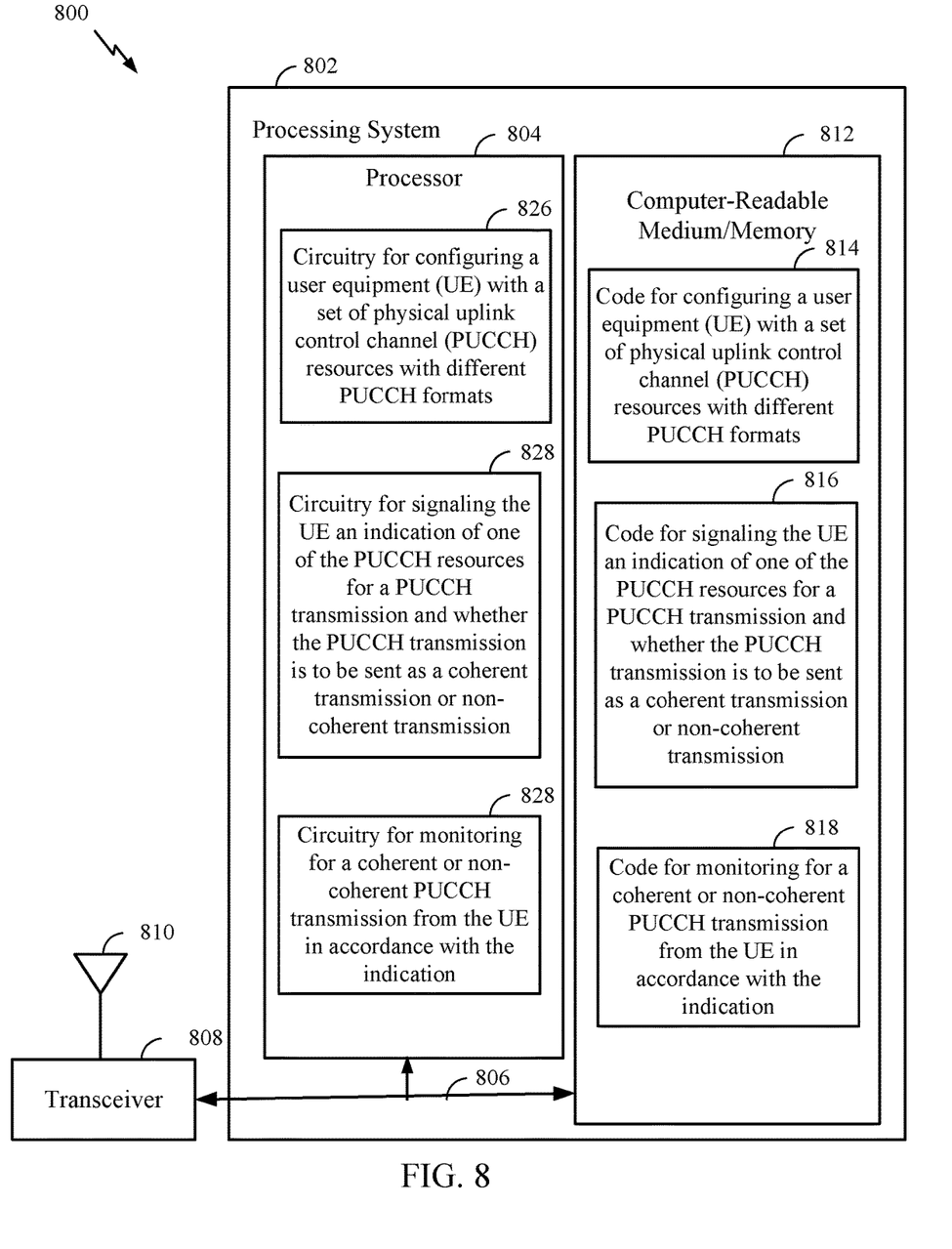

FIG. 8 illustrates a communications device 800 that may include various components (e.g., corresponding to means-plus-function components) configured to perform operations for the techniques disclosed herein, such as the operations illustrated in FIG. 5. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 904 to perform the operations illustrated in FIG. 5, or other operations for performing the various techniques discussed herein. In certain aspects, computer-readable medium/memory 812 stores code 814 for configuring a user equipment (UE) with a set of physical uplink control channel (PUCCH) resources with different PUCCH formats; code 816 for signaling the UE an indication of one of the PUCCH resources for a PUCCH transmission and whether the PUCCH transmission is to be sent as a coherent transmission or non-coherent transmission; and code 818 for monitoring for a coherent or non-coherent PUCCH transmission from the UE in accordance with the indication. The processor 804 includes circuitry 826 for configuring a user equipment (UE) with a set of PUCCH resources with different PUCCH formats; circuitry 828 for signaling the UE an indication of one of the PUCCH resources for a PUCCH transmission and whether the PUCCH transmission is to be sent as a coherent transmission or non-coherent transmission; and circuitry 830 for monitoring for a coherent or non-coherent PUCCH transmission from the UE in accordance with the indication.

Example Aspects

Aspect 1: A method for wireless communications performed by a user equipment (UE), comprising: receiving, from a network entity, a configuration of a set of physical uplink control channel (PUCCH) resources with different PUCCH formats; receiving signaling, from the network entity, indicating one of the PUCCH resources for a PUCCH transmission and whether the PUCCH transmission is to be sent as a coherent transmission or non-coherent transmission; and sending the coherent or non-coherent PUCCH transmission in accordance with the indication.

Aspect 2: The method of Aspect 1, wherein: coherent PUCCH transmissions include demodulation reference signals (DMRS); and the non-coherent PUCCH transmission lack DMRS.

Aspect 3: The method of any one of Aspects 1-2, wherein the configured set of PUCCH resources comprises: a first set of PUCCH resources with PUCCH formats for coherent PUCCH transmissions; and a second set of PUCCH resources with PUCCH formats for non-coherent PUCCH transmissions.

Aspect 4: The method of Aspect 3, wherein each of the first set of PUCCH resources with PUCCH formats for coherent PUCCH transmission has a corresponding PUCCH format in the second set for non-coherent PUCCH transmission.

Aspect 5: The method of Aspect 3, wherein the PUCCH resource for the PUCCH transmission is indicated via a PUCCH resource indicator (PRI).

Aspect 6: The method of Aspect 5, wherein one or more values of the PRI indicate whether the PUCCH transmission is to be sent as a coherent transmission or non-coherent transmission.

Aspect 7: The method of Aspect 3, wherein the PUCCH transmission comprises a dynamic PUCCH transmission.

Aspect 8: The method of any one of Aspects 1-7, wherein the indication of whether the PUCCH transmission is to be sent as a coherent transmission or non-coherent transmission is provided via downlink control information (DCI).

Aspect 9: The method of Aspect 8, wherein the configured set of PUCCH resources comprises same sets of PUCCH resources with formats used for both coherent and non-coherent PUCCH transmissions.

Aspect 10: The method of any of any one of Aspects 1-9, wherein: the PUCCH transmission comprises a semi-static PUCCH transmission; and the indication of the PUCCH resource and whether the PUCCH transmission is to be sent as a coherent transmission or non-coherent transmission is provided via radio resource control (RRC) signaling.

Aspect 11: A method for wireless communications performed by a network entity, comprising: configuring a user equipment (UE) with a set of physical uplink control channel (PUCCH) resources with different PUCCH formats; signaling the UE an indication of one of the PUCCH resources for a PUCCH transmission and whether the PUCCH transmission is to be sent as a coherent transmission or non-coherent transmission; and monitoring for a coherent or non-coherent PUCCH transmission from the UE in accordance with the indication.

Aspect 12: The method of Aspect 11, wherein: coherent PUCCH transmissions include demodulation reference signals (DMRS); and the non-coherent PUCCH transmission lack DMRS.

Aspect 13: The method of any one of Aspects 11-12, wherein the configured set of PUCCH resources comprises: a first set of PUCCH resources with PUCCH formats for coherent PUCCH transmissions; and a second set of PUCCH resources with PUCCH formats for non-coherent PUCCH transmissions.

Aspect 14: The method of Aspect 13, wherein each of the first set of PUCCH resources with PUCCH formats coherent PUCCH transmission has a corresponding PUCCH format in the second set for non-coherent PUCCH transmission.

Aspect 15: The method of Aspect 13, wherein the network entity signals the indication of the PUCCH resource for the PUCCH transmission via a PUCCH resource indicator (PRI).

Aspect 16: The method of Aspect 15, wherein the network entity selects different values of the PRI to indicate whether the PUCCH transmission is to be sent as a coherent transmission or non-coherent transmission.

Aspect 17: The method of Aspect 13, wherein the PUCCH transmission comprises a dynamic PUCCH transmission.

Aspect 18: The method of any one of Aspects 11-17, wherein the network entity signals the indication of whether the PUCCH transmission is to be sent as a coherent transmission or non-coherent transmission via downlink control information (DCI).

Aspect 19: The method of Aspect 18, wherein the configured set of PUCCH resources comprises same sets of PUCCH resources with formats used for both coherent and non-coherent PUCCH transmissions.

Aspect 20: The method of any of any one of Aspects 11-19, wherein: the PUCCH transmission comprises a semi-static PUCCH transmission; and the network entity signals the indication of the PUCCH resource and whether the PUCCH transmission is to be sent as a coherent transmission or non-coherent transmission via radio resource control (RRC) signaling.

Aspect 21: An apparatus, comprising: a memory comprising executable instructions; and one or more processors configured to execute the executable instructions and cause the apparatus to perform a method in accordance with any one of Aspects 1-20.

Aspect 22: An apparatus, comprising means for performing a method in accordance with any one of Aspects 1-20.

Aspect 23: A non-transitory computer-readable medium comprising executable instructions that, when executed by one or more processors of an apparatus, cause the apparatus to perform a method in accordance with any one of Aspects 1-20.

Aspect 24: A computer program product embodied on a computer-readable storage medium comprising code for performing a method in accordance with any one of Aspects 1-20.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120a and/or processors 220, 230, 238, and/or controller/processor 240 of the BS 110a shown in FIG. 2 may be configured to perform operations 400 of FIG. 4 and/or operations 500 of FIG. 5.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for including, means for providing, means for determining, means for staying, means for blocking, and means for initiating may include a processing system, which may include one or more processors, such as processors 258, 264 and 266, and/or controller/processor 280 of the UE 120a and/or processors 220, 230, 238, and/or controller/processor 240 of the BS 110a shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4 and/or FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications performed by a user equipment (UE), comprising:
receiving, from a network entity, a configuration of a set of physical uplink control channel (PUCCH) resources with different PUCCH formats for different types of PUCCH transmissions, the set of PUCCH resources comprising a first set of PUCCH resources with PUCCH formats for coherent PUCCH transmissions and a second set of PUCCH resources with PUCCH formats for non-coherent PUCCH transmissions;
receiving signaling carrying an indication, from the network entity, indicating one of the set of PUCCH resources for a PUCCH transmission and whether the PUCCH transmission is to be sent as a coherent PUCCH transmission or a non-coherent PUCCH transmission; and
sending the coherent PUCCH transmission or the non-coherent PUCCH transmission in accordance with the indication.

2. The method of claim 1, wherein:
the coherent PUCCH transmission includes demodulation reference signals (DMRS); and
the non-coherent PUCCH transmission lacks the DMRS.

3. The method of claim 1, wherein each of the first set of PUCCH resources with the PUCCH formats for the coherent PUCCH transmissions has a corresponding PUCCH format in the second set of PUCCH resources for the non-coherent PUCCH transmissions.

4. The method of claim 1, wherein a PUCCH resource for the PUCCH transmission is indicated via a PUCCH resource indicator (PRI).

5. The method of claim 4, wherein one or more values of the PRI indicate whether the PUCCH transmission is to be sent as the coherent PUCCH transmission or the non-coherent PUCCH transmission.

6. The method of claim 1, wherein the PUCCH transmission corresponds to a dynamic PUCCH transmission.

7. The method of claim 1, wherein the indication of whether the PUCCH transmission is to be sent as the coherent PUCCH transmission or the non-coherent PUCCH transmission is provided via downlink control information (DCI).

8. The method of claim 7, wherein the set of PUCCH resources comprises same sets of PUCCH resources with formats used for both coherent and non-coherent PUCCH transmissions.

9. The method of claim 1, wherein:

the PUCCH transmission corresponds to a semi-static PUCCH transmission; and the indication of a PUCCH resource and whether the PUCCH transmission is to be sent as the coherent PUCCH transmission or the non-coherent PUCCH transmission is provided via radio resource control (RRC) signaling.

10. A method for wireless communications performed by a network entity, comprising:

configuring a user equipment (UE) with a set of physical uplink control channel (PUCCH) resources with different PUCCH formats for different types of PUCCH transmissions, the set of PUCCH resources comprising a first set of PUCCH resources with PUCCH formats for coherent PUCCH transmissions and a second set of PUCCH resources with PUCCH formats for non-coherent PUCCH transmissions;

signaling the UE an indication of one of the set of PUCCH resources for a PUCCH transmission and whether the PUCCH transmission is to be sent as a coherent PUCCH transmission or a non-coherent PUCCH transmission; and monitoring for the coherent PUCCH transmission or the non-coherent PUCCH transmission from the UE in accordance with the indication.

11. The method of claim 10, wherein:

the coherent PUCCH transmission includes demodulation reference signals (DMRS); and the non-coherent PUCCH transmission lacks the DMRS.

12. The method of claim 10, wherein each of the first set of PUCCH resources with the PUCCH formats for the coherent PUCCH transmissions has a corresponding PUCCH format in the second set of PUCCH resources for the non-coherent PUCCH transmissions.

13. The method of claim 10, wherein the network entity signals the indication of a PUCCH resource for the PUCCH transmission via a PUCCH resource indicator (PRI).

14. The method of claim 13, wherein the network entity selects different values of the PRI to indicate whether the PUCCH transmission is to be sent as the coherent PUCCH transmission or the non-coherent PUCCH transmission.

15. The method of claim 10, wherein the PUCCH transmission corresponds to a dynamic PUCCH transmission.

16. The method of claim 10, wherein the network entity signals the indication of whether the PUCCH transmission is to be sent as the coherent PUCCH transmission or the non-coherent PUCCH transmission via downlink control information (DCI).

17. The method of claim 16, wherein the set of PUCCH resources comprises same sets of PUCCH resources with formats used for both coherent and non-coherent PUCCH transmissions.

18. The method of claim 10, wherein:

the PUCCH transmission corresponds to a semi-static PUCCH transmission; and the network entity signals the indication of a PUCCH resource and whether the PUCCH transmission is to be sent as the coherent PUCCH transmission or the non-coherent PUCCH transmission via radio resource control (RRC) signaling.

19. An apparatus for wireless communications performed by a user equipment (UE), comprising:

a receiver configured to receive, from a network entity:

a configuration of a set of physical uplink control channel (PUCCH) resources with different PUCCH formats for different types of PUCCH transmissions, the set of PUCCH resources comprising a first set of PUCCH resources with PUCCH formats for coherent PUCCH transmissions and a second set of PUCCH resources with PUCCH formats for non-coherent PUCCH transmissions, and signaling, from the network entity, carrying an indication indicating one of the set of PUCCH resources for a PUCCH transmission and whether the PUCCH transmission is to be sent as a coherent PUCCH transmission or a non-coherent PUCCH transmission; and a transmitter configured to send the coherent PUCCH transmission or the non-coherent PUCCH transmission in accordance with the indication.

20. The apparatus of claim 19, wherein:

the coherent PUCCH transmission includes demodulation reference signals (DMRS); and the non-coherent PUCCH transmission lacks the DMRS.

21. The apparatus of claim 19, wherein each of the first set of PUCCH resources with the PUCCH formats for the coherent PUCCH transmissions has a corresponding PUCCH format in the second set of PUCCH resources for the non-coherent PUCCH transmissions.

22. The apparatus of claim 19, wherein a PUCCH resource for the PUCCH transmission is indicated via a PUCCH resource indicator (PRI).

23. An apparatus for wireless communications performed by a network entity, comprising:

a transmitter configured to:

send signaling configuring a user equipment (UE) with a set of physical uplink control channel (PUCCH) resources with different PUCCH formats for different types of PUCCH transmissions, the set of PUCCH resources comprising a first set of PUCCH resources with PUCCH formats for coherent PUCCH transmissions and a second set of PUCCH resources with PUCCH formats for non-coherent PUCCH transmissions, and signal the UE an indication of one of the set of PUCCH resources for a PUCCH transmission and whether the PUCCH transmission is to be sent as a coherent PUCCH transmission or a non-coherent PUCCH transmission; and at least one processor coupled to a receiver, the at least one processor and the receiver being configured to monitor for the coherent PUCCH transmission or the non-coherent PUCCH transmission from the UE in accordance with the indication.

24. The apparatus of claim 23, wherein:

the coherent PUCCH transmission includes demodulation reference signals (DMRS); and the non-coherent PUCCH transmission lacks the DMRS.

25. The apparatus of claim 23, wherein each of the first set of PUCCH resources with the PUCCH formats for the coherent PUCCH transmissions has a corresponding PUCCH format in the second set of PUCCH resources for the non-coherent PUCCH transmissions.

26. The apparatus of claim 23, wherein the network entity signals the indication of a PUCCH resource for the PUCCH transmission via a PUCCH resource indicator (PRI).

* * * * *